US006463450B1

(12) United States Patent
Balachandran et al.

(10) Patent No.: US 6,463,450 B1
(45) Date of Patent: Oct. 8, 2002

(54) METHOD AND APPARATUS FOR THE LOCATION OF THE PEAK OF A FUNCTION USING A FILTER BANK

(75) Inventors: Kumar Balachandran, Cary, NC (US); Havish Koorapaty, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/384,111

(22) Filed: Aug. 26, 1999

(51) Int. Cl.[7] .............................................. G06F 17/17
(52) U.S. Cl. ....................... 708/300; 708/207
(58) Field of Search ................... 708/300, 313, 708/322, 207

(56) References Cited

U.S. PATENT DOCUMENTS

| | | | | | |
|---|---|---|---|---|---|
| 4,183,087 A | * | 1/1980 | Huelsman | .................... | 708/207 |
| 4,819,197 A | * | 4/1989 | Blais | ........................... | 708/207 |
| 5,287,387 A | | 2/1994 | Birchler | ....................... | 375/60 |
| 5,638,403 A | | 6/1997 | Birchler et al. | ............. | 375/296 |
| 5,825,809 A | * | 10/1998 | Sim | ............................ | 708/300 |
| 5,995,989 A | * | 11/1999 | Gedcke et al. | ............... | 708/203 |
| 6,134,268 A | * | 10/2000 | McCoy | ........................ | 708/313 |

FOREIGN PATENT DOCUMENTS

JP        10-160507        6/1998

* cited by examiner

*Primary Examiner*—David H. Malzahn
(74) *Attorney, Agent, or Firm*—Coats & Bennett, P.L.L.C.

(57) ABSTRACT

A method and apparatus for determining the location of the peak of a signal using an adaptive filter bank. The method includes the steps of providing a set of calculated output points for the function using a predetermined calculation interval. A maximum output point of the set is then determined, and the output points of the function are interpolated within the region of the maximum. A maximum of the interpolated output points approaches the peak of the function. The apparatus includes a plurality of interconnected digital filters operating on the function to calculate output values, and at least one control unit in communication with the digital filters. The control unit is operable to control the output of the filters and to select a first maximum of the output values. The control unit allows progressive interpolation of output values surrounding the first maximum to determine whether the interpolated output values approach a peak.

23 Claims, 3 Drawing Sheets

METHOD AND APPARATUS FOR THE LOCATION OF THE PEAK OF A FUNCTION USING A FILTER BANK

BACKGROUND OF THE INVENTION

1. Field of the Invention

The present invention relates in general to digital filtering. In particular, the present invention relates to a method and apparatus for determining the peak of a signal function using multiple-resolution techniques.

2. Background of the Invention

Generally, in applications such as ground-based digital cellular mobile networks, it is necessary for the fixed network to determine the location of mobiles within the system. Knowing the location of a mobile relative to a base station allows the network to coordinate handoffs of the mobile to other base stations, thereby maintaining signal strength and resolution as the mobile moves throughout the network and between cells. Typically, such systems determine location through triangulation by a group of base stations which continuously measure the time of arrival of mobiles within their cellular range. Such systems usually measure peaks in the received signal wave function and evaluate time of arrival based on those peaks.

In the past, the task of locating peaks of the signal functions has been solved by exhaustive sampling of each signal. An interpolator working within the region of interest would sample random or interval phase points in an attempt to locate the function. For example, under IS-136 digital cellular standards, the outputs of a synchronized correlation may be available with a sampling period $T_s=5.144 \mu s$. When the system is attempting to locate the position of a mobile unit, the peak of this correlation function needs to be estimated to an accuracy of the order of 30 ns, to yield a range measurement to the mobile with a resolution of 9 m. The ratio of the sampling period to the desired resolution is therefore roughly 172. The standard techniques would need to interpolate the correlation function in the region of interest by a factor of 172, and then determine the maximum of the interpolated output.

Maximization of a discrete function typically requires a search procedure. In conventional techniques, this search procedure is carried out on all of the outputs of the interpolator, and essentially involves interpolating the samples the function at the desired resolution. Special cases of the implementation may include a linear, quadratic or other polynomial-fitting interpolators.

These solutions are complex, however, in that they require systems to process a large number of nonrelevant data points in an attempt to locate a relatively small number of peaks. This sacrifices speed, processing resources and power within any system that requires the detection of signal peaks. In cellular networks in particular, where large numbers of calculations on many mobile units are required, such inefficiencies translate into system bottlenecks that may affect cellular service.

SUMMARY OF THE INVENTION

To obviate one or more of the above problems due to limitations and disadvantages of the related art, the invention is a method and apparatus for determining the location of the peak of a signal function using multi-resolution techniques. The technique is useful when the desired accuracy of the estimated peak is a small fraction of the sampling period of the function.

The present invention may be embodied in a method including the steps of providing a set of calculated output points for the function using a predetermined calculation interval. A maximum output point of the set is then determined, and the output points of the function are interpolated only within the region of the maximum. A maximum of the interpolated output points approaches the peak of the function. This allows accurate detection of the peak of a function in cases where the function is available at a sampling frequency much lower than the desired resolution of the peak.

In another aspect of the invention, a method for approaching the peak of a function using at least one digital filter is provided. The digital filter operates on the function with a plurality of filtering coefficients. The method includes the steps of providing a first set of output points of the function spaced at a uniform interval and determining a first maximum output point. Output points immediately adjacent the first maximum output point are then selected so that the adjacent output points define a first phase region surrounding the first maximum output point. A second set of output points surrounding the first maximum output point along the first phase region is then sampled, and a second maximum output point of the second set of output points is determined. Adjacent output points of the second set are then selected to define a second phase region around the second maximum output point. A third set of output points is then sampled surrounding the second maximum output point along the second phase region, and a third maximum output point is determined. Through these iterations, the determined maximums begin to approach the region of the true peak. Outputs from the function are obtained by changing the filtering coefficients to sample points in varying phases.

In yet another aspect of the present invention, a method for locating the peak of a correlation function waveform is provided. The method includes the steps of loading the shift registers of the filter bank with a first set of correlations calculated at an input sampling period. A first maximum correlation value is then detected from the first set of correlations. The filter coefficients are then updated to obtain a second set of correlations which are shifted in phase from the first set of correlations. The second set of correlations have a period less than the input sampling period and are positioned adjacent to the first maximum correlation value. Finally, a second maximum correlation value is detected from the second set of correlations. This second maximum correlation value improves in approximation to the peak of the function over the first maximum correlation value previously detected.

In yet another aspect of the present invention, a method is provided for locating the peak of a correlation function using a digital filter bank. The method includes the steps of detecting a first maximum correlation value from a first set of correlations which are initially calculated at a uniform first interval. The coefficients of the filter are then changed to obtain a second set of correlations shifted in phase from the first set of correlations. This second set of correlations are spaced at a smaller second interval and exist adjacent to the first maximum correlation value. A second maximum correlation value is then detected from the second set of correlations. This second maximum begins to approach a peak of the function, and the steps of the method are then repeated to calculate iterations only within adjacent phases between progressively smaller intervals.

The invention may be further embodied in an apparatus which includes a plurality of interconnected digital filters operating on the function to calculate output values, and at least one control unit in communication with the digital filters. The control unit controls the output of the filters and selects a first maximum of the output values. The control unit allows progressive interpolation of output values surrounding the first maximum to determine whether the interpolated output values approach a peak.

The invention thus allows the location of the peak of a signal using a high resolution only within a region of interest. This approach has the advantage of reducing the complexity of the interpolative process typically used to located a maximum. By focusing only within a specified phase region, the need for exhaustive random sampling of the entire function is eliminated. Furthermore, the apparatus combining a filter bank for interpolating points in the function and a control unit for isolating interpolative maximums simplifies the hardware, power and time necessary to perform maximization calculations.

The particular embodiments discussed herein may be used in any system where the desired accuracy of an estimated peak is a small fraction of the sampling period of the function. For example, this approach may be implemented in applications such as the location of mobiles within a cellular system.

It is to be understood that both the foregoing general description and the following detailed description are exemplary and explanatory and are intended to provide further explanation of the invention as claimed.

The invention, together with further objects and attendant advantages, will best be understood by reference to the following detailed description, taken in conjunction with the accompanying drawings.

DETAILED DESCRIPTION OF THE PREFERRED EMBODIMENTS

The apparatus of the preferred embodiment preferably includes an adaptive filter that is used to implement a multi-rate filter-bank. The coefficients of the filter can be updated a plurality of times. Clocking the output after a coefficient update provides a different phase of the out put signal. A control unit is provided to load the filter bank with filtering coefficients and to evaluate the samples of the impulse response of the filter at the rate of the input samples and at desired rates.

Figure 1:
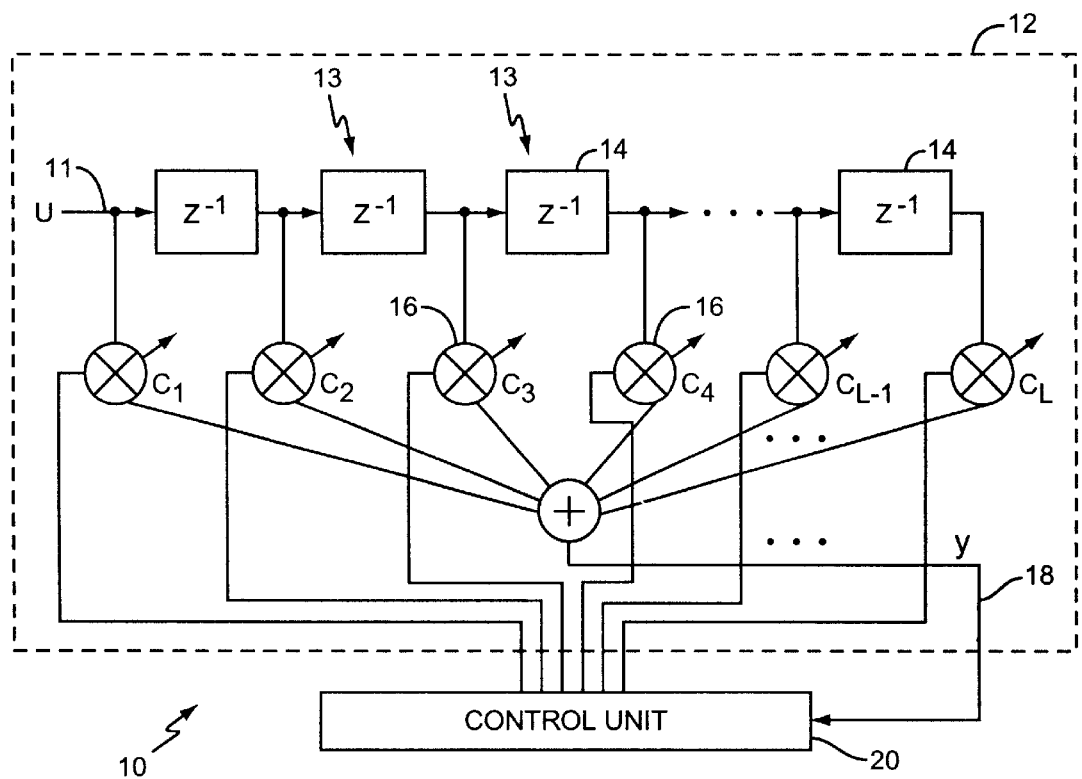
FIG. 1 is a schematic diagram of an adaptive filter bank utilized in a preferred embodiment of the present invention.
Figure 4:
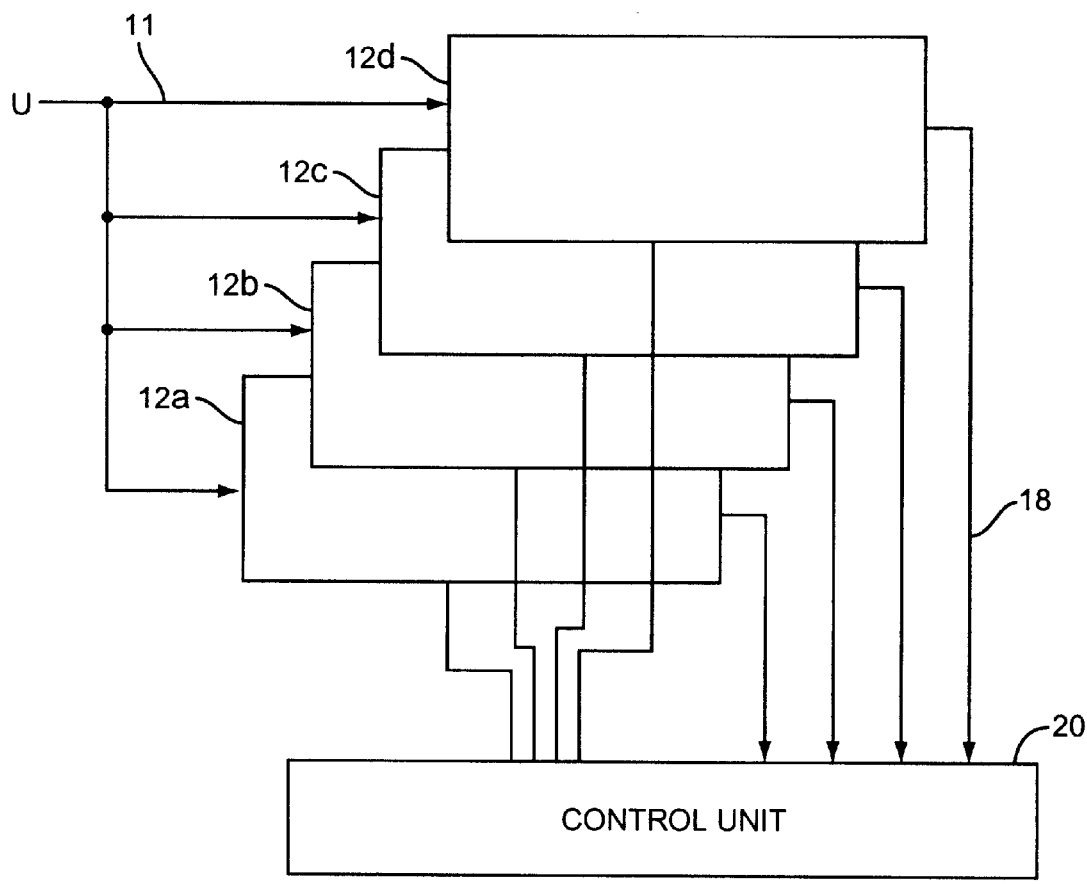
FIG. 4 is a schematic diagram of a plurality of adaptive filter banks utilized in an alternate embodiment of the present invention.

A block diagram showing a schematic representation of the preferred embodiment of the apparatus is shown in FIG. 1. As shown in the Figure, the apparatus 10 includes a single filter 12 including a plurality of delay elements 13. The filter bank 12 preferably includes a plurality of shift registers 14 and multipliers 16. The multipliers 16 operate on the received signal using multiple, variable filtering coefficients Ck, and are linked via circuitry 18 to the control unit 20. The filter bank 12 may be implemented using a traditional form (see Crochiere and Rabiner, "Multirate Digital Signal Processing"). FIG. 4 illustrates an alternative embodiment, wherein multiple filters 12a–12d having shift registers may be used. These may in turn have fixed coefficients. In the preferred embodiment, the filter bank 12 is implemented using a custom application-specific integrated circuit (ASIC) available from a variety of manufacturers, for example, Texas Instruments, Inc. These implementations are exemplary only, and are not intended to be limiting. Thus, one skilled in the art will be able to substitute components from those specified herein.

The proposed filter bank 12 may also be implemented in either hardware or software, and is not a limiting aspect of the present invention. The correlator that generates the values over the window of interest may be combined with the adaptive filter bank so as to schedule the correlation operation at the nominal sample rate prior to the interpolation.

The control unit 20 may comprise a microprocessor, logic, other circuitry or software implemented to perform generally the functions and steps described herein. In the preferred embodiment, an exemplary control unit could include an ARM microprocessor model 7100 manufactured by Advanced Risc Machines with associated memory and clocking circuitry. Preferably, the control unit 20 has the capability to encode a stored program and can act as a general purpose computer as defined within the Harvard machine architecture. The ARM core is available for integration as a component block of an ASIC from several vendors, for example, Texas Instruments, Inc. As noted above, these components are not intended to be limiting to the present invention, and other components may be substituted.

The input u to the circuit is the output of a correlation operation on the received signal with respect to the synchronized wave sequence received from a source such as a mobile unit (not shown). The input is pre-calculated over a fixed window, and the shift register of the filter bank 12 is pre-loaded and sequenced with the calculated correlations by the control unit 20. In the preferred embodiment, the delay $z^{-1}$ refers to the input sampling period.

Figure 2:
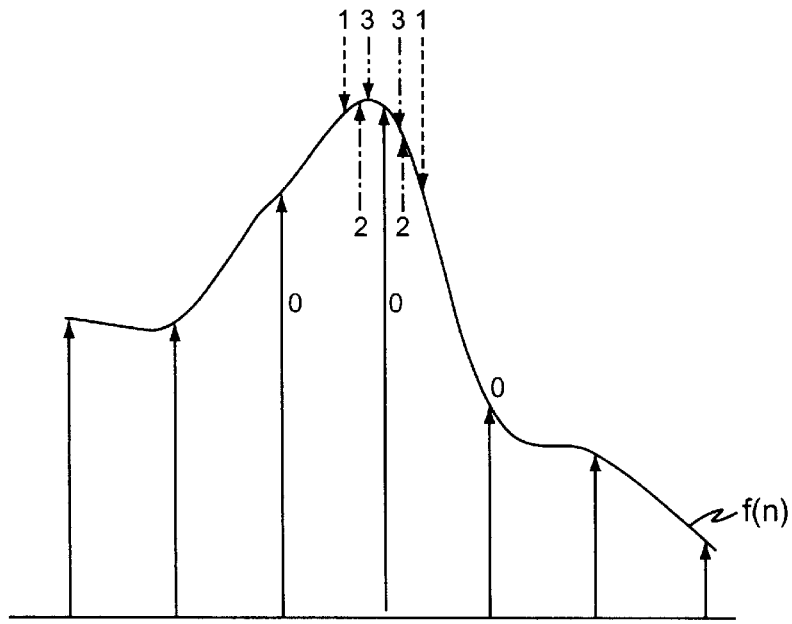
FIG. 2 is a graphical diagram representing the iterative method of the present invention.

FIG. 2 shows the progression of the computations utilized in the system 10 shown in FIG. 1. As shown in the Figure, the implementation efficiently spaces the phases computed so that the peak is determined at the desired resolution in a short time, and with low expenditure of power.

In general, each activation of the filter bank corresponds to the generation of a different phase of the interpolated correlation waveform f(n). In one possible implementation, each activation of the filterbank may be implemented as a direction to a commutator to address and select one particular arm of a polyphase filter structure.

The arrows shown in FIG. 2 are labeled with the phases of interest at each iteration. At the beginning, we have three phases labeled "0" between which the true maximum may lie. At iteration 1, the control unit causes the computation of the output of the filterbank at phases labeled "1." The position of these phases is somewhere in the interval of interest, and could be trivially chosen as a symmetric bisection of the regions defined by the peak and two adjacent samples. Other techniques of bisection, based on the Golden Rule of the Fibonacci sequence may be employed as well (see Knuth, "The Art of Computer Programming: Searching and Sorting").

At each iteration, the locations of the peaks as computed to that point are used to decide the phases of interest for the next computation. The rule used to determine the phases of interest is that these phases must lie on either side of the current maximum. For iteration 3, the regions of interest are defined by the center point labeled "0," and the two points labeled "2" on either side of "0," since the current peak is still at point "0." The phases of interest, the points labeled "3," are therefore bisections of the two regions. These values are computed during iteration 3. After iteration 3, the control unit 20 determines that the point labeled "3" to the left of the center point "0" is the current peak. The regions of interest for the next iteration are then defined by the two closest known points on either side of the point labeled "3," which in this case consist of left-hand point "2" and the centerpoint "0." The following iterations will then use bisections of the newly defined regions. The iteration process is continued until the desired accuracy is achieved.

Figure 3:
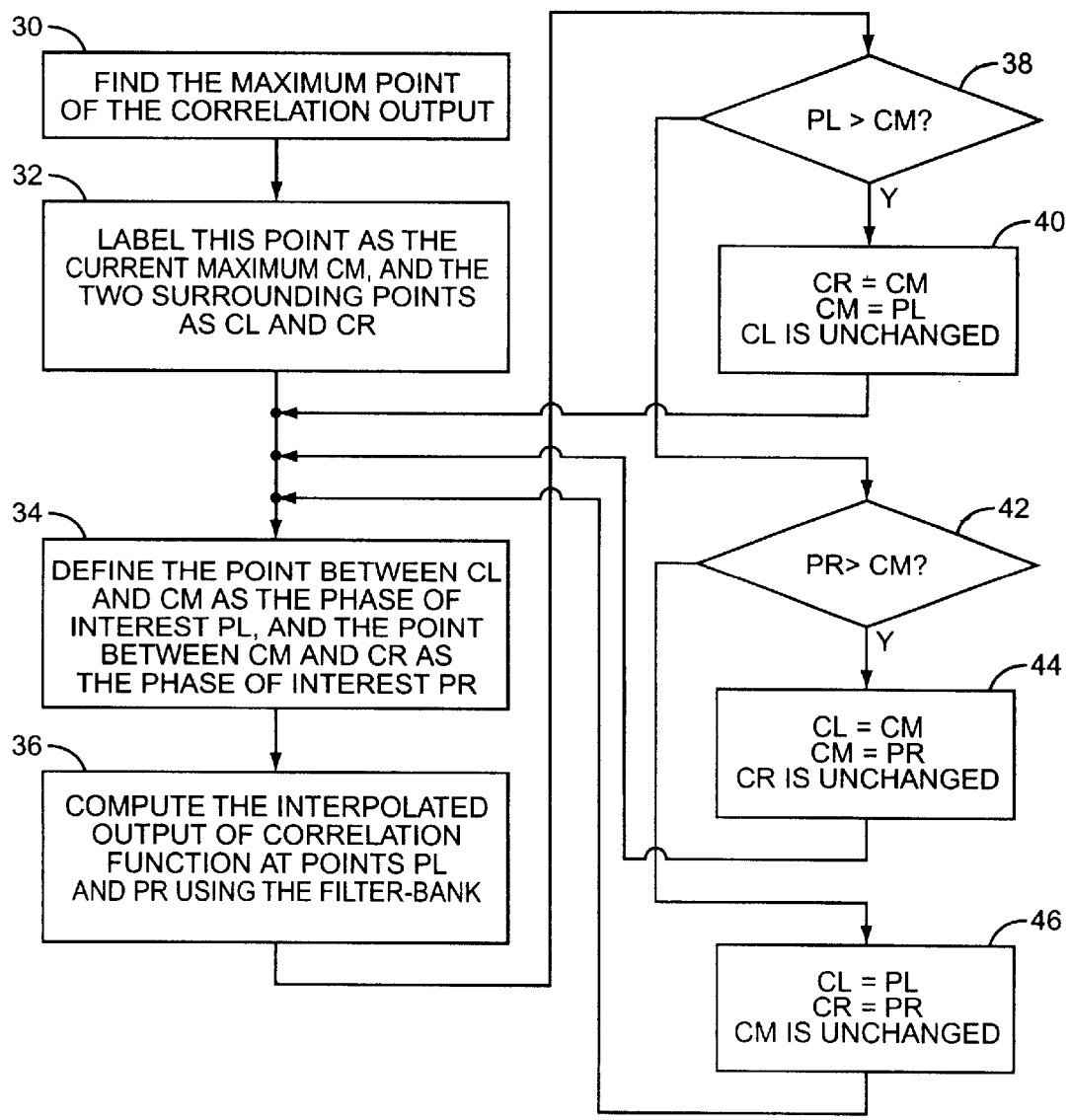
FIG. 3 is a flow diagram showing the steps of a preferred method embodiment of the present invention.

FIG. 3 illustrates the method of the present invention as a flowchart. As shown in the Figure at box 30 in conjunction with the previous Figures, the correlation output from the initial loading of the function is preferably sampled at a preset interval. From this set of points, the control unit 20 determines a maximum point. The control unit then labels this maximum as the "Current Maximum," or "CM," and labels the calculated function output points surrounding it as "CL" and "CR." This step is shown in box 32.

The control unit at box 34 determines the interval points bisecting the interval between CL and CM and bisecting the interval between CM and CR. This bisection around the point CM creates a phase of interest at point PL (between CL and CM) and PR (between CM and CR). Preferably, the control unit 20 then resets and uploads new coefficients to the filter 12, and operates the filter bank 12 to compute the interpolated output of the correlation function at points PL and PR. This step is shown in box 36.

The results of the interpolation of PL and PR are then fed via connection 18 back to the control unit 20, which utilizes logic shown in boxes 38–46 to reset the points and phases of interest. As shown in the flowchart, if the calculated value for the point PL is greater than the value for CM, the points are reset to define a new phase of interest between CL and CM. In particular, CM is reset to designation CR, PL is reset to designation CM, and CL is left unchanged, as shown in box 40. After this resetting, the process repeats from box 34 to further bisect the new phase of interest and interpolate at the new points PL and PR.

As shown at box 42, if the calculated value for the point PL is not greater than CM, and the value for PR is greater than CM, a new phase of interest is defined between CM and CR on the function waveform. Box 44 shows that CM is reset to designation CL, PR is reset to designation CM, and CR is left unchanged. As with box 40, the process is then repeated from box 34 to interpolate new bisected phase points PL and PR within the new phase of interest.

If neither PR nor PL are greater than CM at box 44, then CM remains the current maximum. In order to verify that CM maximizes the function within the highest resolution possible, a new phase of interest is defined at box 46 to more closely examine points around CM. In particular, the new phase of interest centers around point CM and is drawn more narrowly along bisects of the phases between CL and CM and CM and CR. As shown at box 46, phase point PL is changed to designation CL, and phase point PR is changed to designation CR. CM is left unchanged in this instance. After the designations are changed, the process resumes at box 34, and more interpolations are performed on the narrowed phase.

Under all of the above-described conditions, the process continues in the fashion of a binary search until the desired resolution and maximum are encountered. Phases are continually bisected or otherwise divided to focus the iteration process on the area of the maximum.

The present invention therefore combines maximization and interpolation procedures into a single apparatus or method to reduce the number of points at which the interpolator is activated. Due to the apparatus and method of the present invention, the complexity of the iterative process is reduced from O(n) to O(log n) due to the reduction in necessary iterations. The present invention therefore allows more precise interpolation without the waste of resources necessary to interpolate points along the entire function curve.

As noted above, the primary application envisaged for the present invention is in position-location systems, such as those utilized in digital cellular networks to allow location of mobile units within the network. In such applications, a correlation signal may be generated by correlating the signal received from a mobile station with a synchronized system sequence. By determining the location of the peak of the correlation signal, the distance to the mobile can be determined with high resolution at a particular cellular base station. Through triangulation in combination with calculations performed by other base stations, the position of the mobile can be determined with high resolution, as typically required by present federal regulations.

It must also be noted that there are a variety of applications to which the present invention may be applied. One application is to identify the time of arrival of a pulse train. Another application could be to identify the peak of the spectrum of a processed signal within a spectrum analysis process. Also, the peak detection problem may be converted to the inverse problem of estimating a zero or a minimum of a general function as well, and the use of the term "peak" is not to be considered a limiting aspect of the invention. In general, the invention can be applied to any application that demands the determination of a function optimum with a very high resolution, where efficiency can be gained through a reduced number of iterations.

Of course, it should be understood that a wide range of changes and modifications can be made to the embodiments described above. For example, any or all portions of the preferred embodiment may be implemented in software as well as with hardware. It is therefore intended that the foregoing detailed description be regarded as illustrative rather than limiting and that it be understood that it is the following claims, including all equivalents, which are intended to define the scope of this invention.

We claim:

1. A method for locating a peak of a function represented as a sample set, said method comprising:

filtering the sample set at a first phase with a multi-phase digital filter to obtain a first set of output points;

determining a maximum output point in said first set;

generating additional output points of said function within a first region surrounding the maximum output point in said first set based on filtering said sample set with said digital filter at different phases lying within said first region;

determining a new maximum output point of said function as a maximum one of the maximum output point in said first set and said additional output points.

2. The method of claim 1 wherein said digital filter generates output points at a uniform interval for a given phase.

3. The method of claim 2 wherein said output points are synchronized with a clock output.

4. The method of claim 1 wherein said first region is bounded by output points in said first set immediately adjacent said maximum output point in said first set.

5. The method of claim 4 wherein said additional output points comprise outputs from said digital filter having a phase shifted from said first set of output points.

6. A method for estimating the peak of a function using at least one digital filter having a multi-phase output, said digital filter operating on said function with a plurality of filtering coefficients, wherein said filtering coefficients determine a phase of said multi-phase output, said method comprising:
   providing a sample set corresponding to said function;
   calculating a first set of output points based on filtering said sample set with said digital filter at a first phase;
   determining a first maximum output point of said first set of output points;
   selecting adjacent output points immediately adjacent said first maximum output point, said adjacent output points defining a first phase region surrounding said first maximum output point;
   resetting the coefficients of said filter to a phase within said first phase region and calculating a second set of output points using said sample set;
   determining a second maximum output point of said second set of output points;
   selecting adjacent output points of said second set of output points immediately adjacent said second maximum output point, said adjacent output points defining a second phase region around said second maximum output point;
   resetting the coefficients of said filter to a phase within said second phase region and calculating a third set of output points using said sample set
   determining a third maximum output point of said third set of output points; and
   identifying a maximum one of said first, second, and third maximum output points.

7. A method for locating the peak of a correlation function waveform using a digital filter bank, said digital filter bank having a plurality of shift registers and operating on said function with a plurality of filtering coefficients, said method comprising:
   filtering a first set of correlation values with said digital filter to obtain a first filtered set of correlated values;
   detecting a first maximum correlation value in said first filtered set of said correlation values;
   updating said filtering coefficients of said digital filter to obtain a second filtered set of correlation values shifted in phase from said first filtered set of correlation values; and
   detecting a second maximum correlation value in said second filtered set of correlation values; and
   identifying a new maximum correlation value as a maximum one of said first and second maximum correlation values.

8. A method for locating the peak of a correlation function using a digital filter bank, said digital filter bank operating on a first set of correlation values corresponding to said correlation function, said method comprising:
   detecting a first maximum correlation value from said first set of correlation values;
   changing filtering coefficients of said digital filter bank to obtain a second set of correlation values shifted in phase from said first set of correlation values;
   detecting a second maximum correlation value from said second set of correlation values; and
   identifying a new maximum correlation value as a maximum one of said first and second maximum correlation values.

9. An apparatus for locating the peak of a function, said apparatus comprising:
   at least one digital filter operating on said function to calculate output values at a desired phase, said filter operable to successively calculate output values at differing sample phases, wherein a sampling phase of said digital filter depends on filtering coefficients of said digital filter; and
   at least one control unit in communication with said digital filter, said control unit operable to update said filtering coefficients to adjust a desired phase of said output values and to select a first maximum of said output values;
   said control unit further operable to adjust the desired phase to successively calculate output values surrounding said first maximum and to determine whether a current maximum in said successively calculated output values estimates said peak.

10. The apparatus of claim 9, wherein said control unit is further operable to select at least one of said successively calculated output values as a second maximum if said at least one of said successively calculated output values exceeds said current maximum.

11. The apparatus of claim 10 wherein said control unit further comprises a microprocessor.

12. The apparatus of claim 11 wherein said control unit is further operable to decrease the interval of said interpolated output values as said interpolated output values approach said peak.

13. A method of finding a peak of a function based on multi-phase digital filtering, the method comprising:
   identifying a maximum sample value in a first sample set of the function;
   shifting a phase of a digital filter based on the maximum sample value;
   filtering the first sample set with the digital filter to obtain a shifted sample set shifted in phase relative to the first sample set; and
   identifying a new maximum sample of the function based on:
      identifying first and second regions of interest in the shifted sample set as being between a current maximum sample and left and right adjacent samples in the shifted sample set, respectively;
      shifting the phase of the digital filter to sample phases within the first and second regions of interest and filtering the first sample set with the digital filter to obtain first and second comparison samples, respectively;
      determining the new maximum sample of the function as one of the current maximum sample and first and second comparison samples.

14. The method of claim 13, further comprising repeating the step of identifying a new maximum sample of the function until a phase difference between the current maximum sample and the new maximum sample meets a desired peak detection resolution.

15. The method of claim 13, wherein the digital filter comprises a plurality of digital filters at plurality of phase offsets, and wherein repeating the step of identifying a new maximum sample of the function comprises comparing maximum samples between shifted samples in a plurality of shifted sample sets generated by the plurality of digital filters.

16. The method of claim 15, wherein shifting the phase of the digital filter comprises selecting a shifted sample set corresponding to a desired sampling phase from the plurality of shifted sample sets.

17. The method of claim 15, further comprising defining a desired incremental phase offset between each of the plurality of digital filters, such that the plurality of shifted samples sets corresponds to successively phase-shifted samples sets, with a desired incremental phase difference between pairs of successively phase-shifted sample sets.

18. The method of claim 13, wherein the digital filter comprises an adaptive filter including variable filtering coefficients, and wherein shifting the phase of the digital filter based on the maximum sample value comprises updating the variable filter coefficients based on a phase offset of the maximum sample value.

19. The method of claim 18, wherein, within the step of identifying a new maximum sample of the function, shifting the phase of the digital filter to sample phases within the first and second regions of interest, and filtering the first sample set with the digital filter to obtain first and second comparison samples comprises:

updating the variable coefficients of the digital filter based on the phase of a first selected sample point within the first region of interest and filtering the first sample set with the digital filter to obtain the first comparison sample; and updating the variable coefficients of the digital filter based on the phase of a second selected sample point within the second region of interest and filtering the first sample set with the digital filter to obtain the second comparison sample.

20. The method of claim 19, further comprising determining the first and second selected sample points as the bisections of sample points lying between the left adjacent and right adjacent samples, respectively, and the current maximum sample in the shifted sample set.

21. The method of claim 13, further comprising generating the first sample set at a first sampling interval and a first sampling phase.

22. The method of claim 21, wherein shifting the phase of the digital filter comprises adjusting the phase of the filter relative to the first sampling phase.

23. The method of claim 21, wherein generating the first sample set at a first sampling interval and a first sampling phase comprises correlating a received, signal waveform to generate a set of correlation sample values as the first sample set.

* * * * *